(12) United States Patent
Meng et al.

(10) Patent No.: US 8,732,717 B2
(45) Date of Patent: May 20, 2014

(54) RESOURCE ALLOCATION (75) Inventors: Fan Jing Meng, Beijing (CN); Xin Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 13/190,642

(22) Filed: Jul. 26, 2011

(65) Prior Publication Data

US 2012/0030684 A1 Feb. 2, 2012

(30) Foreign Application Priority Data

Jul. 30, 2010 (CN) .......................... 2010 1 0244722

(51) Int. Cl.
*G06F 9/46* (2006.01)
(52) U.S. Cl.
USPC ......................................... 718/104; 718/102
(58) Field of Classification Search
None
See application file for complete search history.

(56) References Cited

U.S. PATENT DOCUMENTS

| 2002/0114309 A1* | 8/2002 | Chow et al. ................... 370/347 |
| 2010/0146515 A1* | 6/2010 | Shpigelman .................. 718/104 |
| 2010/0217631 A1* | 8/2010 | Boss et al. ........................ 705/7 |

* cited by examiner

*Primary Examiner* — Camquy Truong
(74) *Attorney, Agent, or Firm* — A. Bruce Clay (57) ABSTRACT

At least one candidate allocation time period is determined according to a resource benefit time step function. The resource benefit does not vary with time in the at least one candidate allocation time period. Resources and relations between the resources are converted into sub-resource groups according to the resource cost time step function. Each of the sub-resource groups comprise sub-resources that correspond to the resources and relations between the sub-resources. The resource benefits and resource costs of the sub-resources do not vary with time. With respect to the at least one candidate allocation time period, the sub-resource groups are input into a resource schedule optimizer to obtain optimized results with respect to the sub-resource groups. An optimized result, with respect to the at least one candidate allocation time period, is obtained from the optimized results with respect to the sub-resource groups.

6 Claims, 2 Drawing Sheets

RESOURCE ALLOCATION

BACKGROUND

The present invention relates to computer technology, and more specifically to resource allocation.

In Cloud computing, particularly in scenarios of Software-as-a-Service (SaaS), a subscriber can flexibly "lease" from a SaaS provider a right to use an application for a period of time. In this way, the subscriber does not need to pay for purchasing the application. A SaaS provider can either "lease" or purchase resources to run the leased applications. The resources may be hardware, software or a combination of hardware and software resources. The hardware resources may be, for example, a processor, memory, bandwidth, storage capacity, etc. The software resource may be, for example, a web application server, DBMS, a portal server, etc. The combined resources may be for example, a standard virtual machine, a standard web application run time virtual machine, and etc.

To optimize resource utilization, it is best to use as few resources as possible while allowing as many accesses to the applications as possible. This requires taking resource benefits, resource costs and relations between resources into consideration. Currently available resource schedule optimizers do not vary both the resource benefits and resource costs with time, and, therefore, results obtained with fixed resource benefits and resource costs are inaccurate.

Resource benefits of a certain amount of resources can be represented by an actual amount of accesses increased by adding the certain amount of resources. Those skilled in the art would appreciate that, although more resources can bring a larger allowable amount of accesses to the applications, when the allowable amount of accesses exceeds an actual number of access requests, further increasing the allowable amount of accesses will not bring an incremental increase of the actual accesses. Therefore, the actual amount of accesses increased by the certain amount of resources at a moment depends not only on the already allocated resources, i.e., the existing allowable amount of accesses, but also on an actual number of access requests. Since both the already allocated resources and the actual number of access requests vary with time, the actual amount of accesses increased by adding the certain amount of resources will also vary with time, such that resource benefits of the certain amount of resources will also vary with time.

Resource costs may be represented by a percentage of the certain amount of resources in the unallocated resources. Those skilled in the art would appreciate that, in a period of time where resources are in short supply, the cost of using resources is higher than in a period of time where resources are in abundance. Furthermore, the resource costs also depend on other factors, for example, in a case where the SaaS provider purchases his own hardware to run the leased applications, fees for the hardware, per se, and fees for maintaining the hardware vary with time, so the resource costs also vary with time.

The relations between the resources are always relatively fixed. For example, a standard virtual machine comprises a certain amount of hardware resources plus a set of virtual machine management programs, so the standard virtual machine resource relies on the hardware resources and the virtual machine management program software resources. Again, for example, a standard web application run time virtual machine comprises a set of web application servers and DBMS software resources, and a standard virtual machine, so the standard web application run time virtual machine relies on the web application server software resources, DBMS software resources and standard virtual machine resources. In addition to the above reliance relations, exclusive relations may exist between the resources.

The actual amount of accesses to some applications may be more sensitive to a certain resource or may vary with time. For example, an actual amount of accesses of the applications in a period of time may mainly depend on a number of processor cores allocated to the applications, but in another period of time may mainly depend on a bandwidth allocated to the applications.

BRIEF SUMMARY

According to an embodiment of the invention, a resource allocation method determines at least one candidate allocation time period according to a resource benefit time step function. The resource benefit does not vary with time in the at least one candidate allocation time period. Resources and any predetermined relations between the resources are converted into sub-resource groups according to the resource cost time step function. The sub-resource groups comprise sub-resources that correspond to the resources and relations between the sub-resources. The resource benefits and resource costs of the sub-resources do not vary with time. With respect to the at least one candidate allocation time period, the sub-resource groups are input into a resource schedule optimizer to obtain optimized results with respect to the sub-resource groups. An optimized result with respect to the at least one candidate allocation time period is obtained from the optimized results with respect to the sub-resource groups.

According to an embodiment of the invention, a resource allocation method determines at least one candidate allocation time period according to a resource benefit time step function. The resource benefit does not vary with time in the at least one candidate allocation time period. Resources and relations between the resources are converted into sub-resource groups according to the resource cost time step function. The sub-resource groups comprise sub-resources that correspond to the resources and relations between the sub-resources. The resource benefits and resource costs of the sub-resources do not vary with time. With respect to the at least one candidate allocation time period, the sub-resource groups are input into a resource schedule optimizer to obtain optimized results with respect to the sub-resource groups. An optimized result with respect to the at least one candidate allocation time period is obtained from the optimized results with respect to the sub-resource groups.

According to an embodiment of the invention, a resource allocation computer program product determines at least one candidate allocation time period according to a resource benefit time step function. The resource benefit does not vary with time in the at least one candidate allocation time period. Resources and relations between the resources are converted into sub-resource groups according to the resource cost time step function. The sub-resource groups comprise sub-resources that correspond to the resources and relations between the sub-resources. The resource benefits and resource costs of the sub-resources do not vary with time. With respect to the at least one candidate allocation time period, the sub-resource groups are input into a resource schedule optimizer to obtain optimized results with respect to the sub-resource groups. An optimized result with respect to the at least one candidate allocation time period is obtained from the optimized results with respect to the sub-resource groups.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable media (memory or device) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
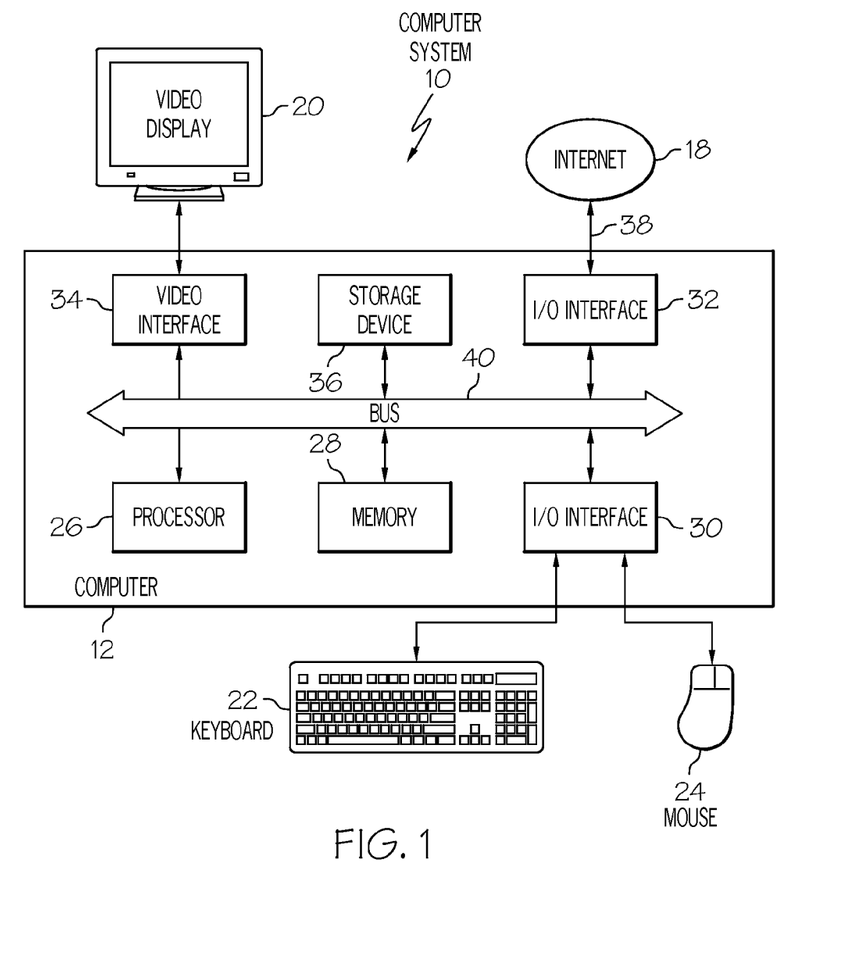
FIG. 1 is an illustration of a computer system operable with the present invention.

FIG. 1 is one example of a computer system 10 suitable for executing computer software in accordance with an embodiment of the present invention. Other processing devices which are suitable for executing the software can be a wireless telephone, personal assistant device (PDA), portable computer, smart remote control device, or any other processing devices that can execute such software.

The computer system 10 is of a type that executes under a suitable operating system installed on the computer system 10. The components of the computer system 10 include a computer 12, a keyboard 22, mouse 24, and a video display 20. The computer 12 includes a processor 26, a memory 28, input/output (I/O) interfaces 30 and 32, a video interface 34, and a storage device 36.

The processor 26 is a central processing unit (CPU) that executes the operating system and the computer software executing under the operating system. The memory 28 includes random access memory (RAM) and read-only memory (ROM), and is used under direction of the processor 26.

The video interface 34 is connected to a video display 20 and provides video signals for display thereon. User input to operate the computer 12 is provided from the keyboard 22 and mouse 24. The storage device 36 can include a disk drive or any other suitable storage medium, as discussed above. Each of the components of the computer 12 is connected to an internal bus 40 that includes data, address, and control buses, to allow components of the computer 12 to communicate with each other via the bus 40. The computer system 10 can be connected to one or more other similar computers via an input/output (I/O) interface 32 using a communication channel 38 to a network, represented as the Internet 18. One or more servers 19 may be connected to the computer 12 via a network, such as, the Internet 18. The servers 19 may comprise the same physical arrangement as the computer 12 and may be co-located with or a part of the computer 12.

The computer software may be recorded on a computer readable storage medium, in which case, the computer software program is accessed by the computer system 10 from the storage device 36. Alternatively, the computer software can be accessed directly from the Internet 18 by the computer 12. In either case, a user can interact with the computer system 10 using the keyboard 22 and mouse 24 to operate the programmed computer software executing on the computer 12.

Both resource benefits and resource costs vary with time, so variations of the resource benefits or resource costs with time can be described by using a time step function in which time serves as an independent variable and resource benefits or resource costs serve as dependent variables. An example is described below, in which there are four resources, denoted by F1, F2, F3, and F4, wherein the resource F1 relies on the resource F2, and the resource F4 relies on the resource F3. In the example, for the sake of simplicity and for the convenience of subsequent description, exclusive relations between the resources are not given. The time step function in which resource benefits and resource costs vary with time is represented in the form of a list as shown in Table 1 wherein D1 and D2 are two adjacent time periods, and Table 2 wherein D3, D4 and D5 are also consecutively adjacent time periods.

TABLE 1

A time step function in which resource benefits vary with time

| Resource | Time period D1 | Time period D2 |
|---|---|---|
| F1 | 8 | 4 |
| F2 | 4 | 2 |
| F3 | 6 | 8 |
| F4 | 8 | 4 |

Assume that resource benefits of a certain amount of resources are represented by the actual amount of accesses increased by adding the certain amount of resources. As shown in Table 1, if a moment at which the resource F1 is allocated to an application, i.e., F1 allocation moment, falls into the time period D1, an actual amount of accesses is increased by 8, and, if the F1 allocation moment falls into the time period D2, an actual amount of accesses is increased by 4. Similarly, if a moment at which the resource F3 is allocated to the application, i.e., F3 allocation moment, falls into the time period D1, an actual amount of accesses is increased by 6, and, if the F3 allocation moment falls into the time period D2, an actual amount of accesses is increased by 8. As previously described above, an actual amount of accesses increased by a certain amount of resources at a moment depends on not only the already allocated resources, i.e., the existing allowable amount of accesses, but also an actual number of access requests. Since both the already allocated resources and the actual number of access requests vary with time, the actual amount of accesses increased by adding the certain amount of resources will also vary with time, such that resource benefits of the certain amount of resources will also vary with time. Again, since an application may rely more on one certain resource at a moment for providing an actual amount of accesses, and may rely more on another resource at another moment for providing an actual amount of accesses, allocating different resources to the application at the same moment may possibly bring a different increment to the actual amount of accesses.

TABLE 2

A time step function in which resource costs vary with time

| Resource | Time period D3 | Time period D4 | Time period D5 |
|---|---|---|---|
| F1 | 300 | 100 | 200 |
| F2 | 300 | 100 | 200 |
| F3 | 525 | 175 | 350 |
| F4 | 225 | 75 | 150 |

As shown in Table 2, if a moment at which the resource F1 is requested to be allocated to an application, i.e., F1 request moment, falls into the time period D3, a cost of 300 is needed;

if the F1 request moment falls into the time period D4, a cost of 100 is needed; if the F1 request moment falls into the time period D5, a cost of 200 is needed.

Those skilled in the art would appreciate that, so-called "allocating a resource to an application" refers to allocating a unit amount of the resource to the application. The unit amount of individual resources is not necessarily the same, for example, a unit amount of a processor resource may be a processor core, and a unit amount of a bandwidth resource may be a 2M network bandwidth. Both resource benefits and resource costs are represented by unit amounts.

Those skilled in the art would appreciate that, since a factor that decides the resource benefits varying with time is independent of a factor that decides the resource costs varying with time, the time periods D1 and D2 are also independent of the time periods D3, D4 and D5. Thus, as long as the length of the time period is short enough, a set of time periods in each of which both resource benefits and resource costs, of the individual resources, are maintained unchanged, can be found. Therefore, for sake of simplicity, it can be further assumed that the time period D1 coincides with the time period D4, and the time period D2 coincides with the time period D5. In addition, it can be seen that, under such an assumption, the time period D3 precedes the time period D1. In practical situations, there always needs to be a period of time from the moment to request a resource (i.e., request moment) to the moment to allocate the resource (i.e., allocation moment), so this assumption is also satisfied.

Figure 2:
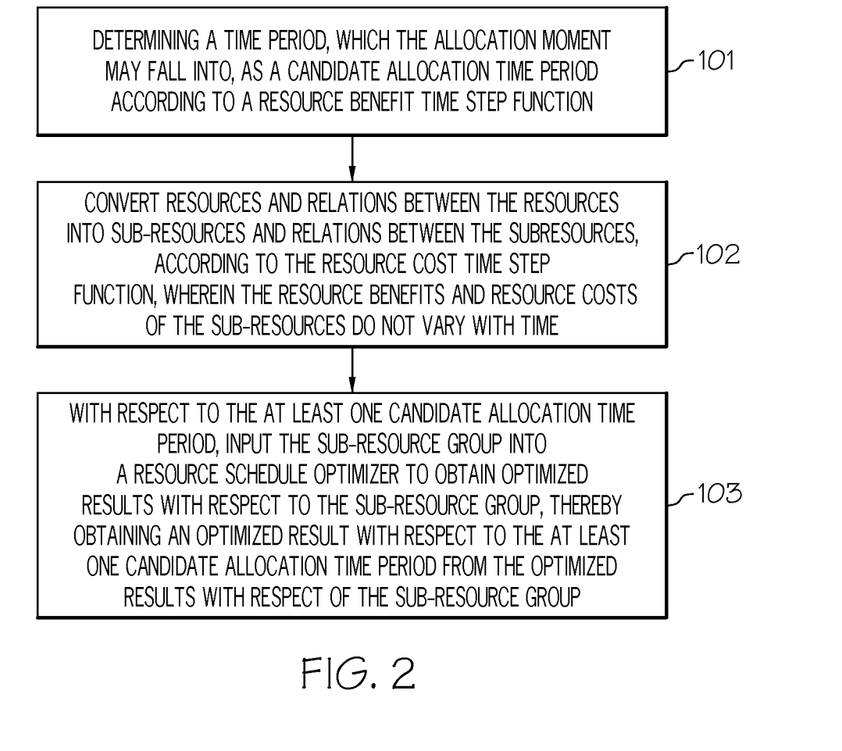
FIG. 2 is a flow chart showing a resource allocation method according to an embodiment of the invention.

The resource allocation method in accordance with one embodiment of the invention is described below with reference to FIG. 2. In the following description, both resource benefits and resource costs vary with time in accordance with the time step function. Those skilled in the art would appreciate that, the method described below is adapted to the situation where one of the resource benefits and resource costs varies with time, but the other one does not vary with time.

In step 101 a time period is determined, which the allocation moment may fall into, as a candidate allocation time period according to a resource benefit time step function.

In the above example, the allocation moment may fall into the time period D1 or the time period D2, so the time period D1 and the time period D2 are candidate allocation time periods.

Step 102 converts the resources and relations between the resources into sub-resources and relations between the sub-resources according to the resource cost time step function, wherein the resource benefits and resource costs of the sub-resources do not vary with time.

There may be reliance relations or exclusive relations between the resources, or there may be neither reliance relations nor exclusive relations between the resources. Here, the situation that there are neither reliance relations nor exclusive relations is also regarded as a special relation between the resources or sub-resources.

As will be seen later, if there are reliance relations between the resources, reliance relations also exist between the converted sub-resources; if there are no reliance relations between the resources, reliance relations do not exist between the converted sub-resources either; if there are exclusive relations between the resources, exclusive relations also exist between the converted sub-resources. Even if there are no exclusive relations between the resources, exclusive relations may exist between the converted sub-resources.

In step 103, with respect to each candidate allocation time period, the sub-resources and the relations between the sub-resources are input into a resource schedule optimizer to obtain optimized results with respect to the sub-resource groups. The optimized results are then compared with respect to the sub-resource groups to obtain an optimized result with respect to the at least one candidate allocation time period.

As previously described above, there are resource schedule optimizers. Inputs to the resource schedule optimizers are resources, resource benefits, resource costs, reliance relations between the resources and exclusive relations between the resources. Executing an optimization operation once by the resource schedule optimizer can only be directed to fixed resource benefits and fixed resource costs (i.e., they do not vary with time). If the resources and relations between them are converted into sub-resources and relations between them, and the resource benefits and resource costs of the sub-resources do not vary with time, the sub-resources can be used as input to be optimized by the resource schedule optimizer to obtain an optimized result.

A specific implementation of the steps 102 and 103 according to an embodiment of the invention will now be described in detail below.

As described before, as long as the length of the time period is short enough, a set of time periods can be found in which resource benefits and resource costs of the individual resources remain unchanged. According to one embodiment of the invention, optimization may be made respectively by using a traditional resource schedule optimizer in each time period among the set of time periods to obtain a local optimum result in the time period, and all the local optimum results in the set of time periods are compared with each other to obtain a global optimum result.

As shown in Table 2, there are four resources in total. For each resource, the time step function of the resource cost thereof has 3 values. Therefore, there are in total $3^4$, i.e., 81 possible resource cost combinations, that is, the F1 request moment respectively falls into D3, D4 and D5, the F2 request moment respectively falls into D3, D4 and D5, the F3 request moment respectively falls into D3, D4 and D5, and the F4 request moment respectively falls into D3, D4 and D5. For each resource, in each of the 81 combinations, there are representations which represent that the request moment of the resource falls into a period of time, for example, for the resource F1, there are 81 representations in all in the 81 resource combinations, denoted by F1-01, F1-02, ..., F1-81, respectively. These representations are all sub-resources of the resource F1. Those skilled in the art would appreciate that, among the 81 sub-resources of F1, there are 27 representations representing that the request moment of the resource F1 falls into D3, there are 27 representations representing that the request moment of the resource F1 falls into D4, and there are 27 representations representing that the request moment of the resource F1 falls into D5. The resources F2, F3 and F4 are also converted into sub-resources in the same way. Furthermore, relations between the sub-resources are determined according to the relations between the resources.

In this way, a set of sub-resources may be denoted as:

(F1-x, F2-x, F3-x, F4-x), wherein x is a natural number in a closed interval [1, 81];

F1-x relies on F2-x, F4-x relies on F3-x; and exclusive relations do not exist.

It can be seen that, a sub-resource group comprises sub-resources representative of a combination of resource costs, whereby 81 sub-resource groups representative of 81 combinations of resource costs are obtained.

For each candidate allocation time period, the resource schedule optimizer is invoked for 81 times, and each time a set of sub-resources where x takes a natural number in the closed interval [1, 81], and resource benefits and resource costs corresponding to the sub-resources are inputted. As an example, inputs to the resource schedule optimizer when the resource schedule optimizer is invoked once may be:
sub-resource F1-1, resource benefit 8, resource cost 300;
sub-resource F2-1, resource benefit 4, resource cost 100;
sub-resource F3-1, resource benefit 6, resource cost 525;
sub-resource F4-1, resource benefit 8, resource cost 225;
sub-resource F1-1 relying on sub-resource F2-1; and
sub-resource F4-1 relying on sub-resource F3-1.

The resource schedule optimizer can optimize this set of inputs to select a combination of sub-resources that not only satisfies a desired resource benefit condition but also satisfies a desired resource cost condition. For example, assume that the desired resource benefit condition is that the resource benefit is as large as possible, and the desired resource cost condition is that the resource cost is less than or equal to 400. Under these conditions, the resource schedule optimizer will select sub-resources F1-1 and F2-1 as the optimized results (benefits=12 (8+4); and costs≤400 (300+100)) of the set of inputs. Although the combination of the sub-resources F2-1 and F4-1 can also obtain a resource benefit of 12 (4+8) and an even lower resource cost 325 (100+225), since the sub-resource F4-1 relies on the sub-resource F3-1, there would be, in fact, a resource cost of 850 (100+225+525).

After the resource schedule optimizer is invoked for 81×2=162 times in all, 162 local optimum optimized results are obtained, and by comparing resource benefits and resource costs of the 162 local optimum optimized results, a global optimum optimized result is obtained.

Alternatively, before invoking the resource schedule optimizer by using a set of sub-resources as inputs, it can be judged whether there are sub-resources that make the request moment of the resource posterior to the allocation moment, among the set of sub-resources. For example, if a sub-resource corresponds to the candidate allocation time period D1, but the corresponding allocation time period is D5, then the set of sub-resources including the sub-resource shall not be used as an input to the resource schedule optimizer.

The above described method is a serialization method with a computation complexity of $O(M^N)$, where M is the number of the resources, and N is the number of time periods in the set of time periods. Further, let R denote a number of reliance relations between the resources, and for M resources, total resource benefits thereof change for p times and total resource costs thereof change for q times. In optimization by using the serialization method, there needs optimization for $p*q^N$ times in worst case, that is, the resource schedule optimizer is invoked for $p*q^N$ times. In addition, in the optimization by using the serialization method, there are M resources input to the resource schedule optimizer and the number of reliance relations is R.

In order to improve the serialization method, the following measures may be taken: reducing the computation complexity, reducing the number of invoking the resource schedule optimizer, and increasing the number of resources input to the resource schedule optimizer. Those skilled in the art would appreciate that, many computations will occur each time the resource schedule optimizer is invoked, so the number of times the resource schedule optimizer is invoked should be as little as possible. The resource schedule optimizer is provided with more sub-resources and more relations therebetween when the resource schedule optimizer is invoked once, which is particularly beneficial in the case where the resource schedule optimizer is implemented by hardware, because more inputs mean more parallel processing. Furthermore, the more any exclusive relations between the sub-resources inputted to the resource schedule optimizer can be identified, a space to be selected by the resource schedule optimizer during optimization can be further reduced, which facilitates the resource schedule optimizer to select an optimized result from the space of selection.

A specific implementation of the steps 102 and 103 according to another embodiment of the invention will be described below.

First, original resources can be converted into the following sub-resources according to the above-mentioned resource cost time step function. The sub-resource shown in Table 3 correspond to the situation where the candidate allocation time period is D1, and the sub-resources shown in Table 4 correspond to the situation the candidate allocation time period is D2.

TABLE 3

Sub-resources divided according to the resource cost time step function (candidate allocation time period D1)

| Original resource | Converted resource | cost | Time period of request moment | benefit | Time period of allocation moment |
|---|---|---|---|---|---|
| F1 | F11 | 300 | D3 | 8 | D1 |
|    | F12 | 100 | D4 | 8 | D1 |
| F2 | F21 | 300 | D3 | 4 | D1 |
|    | F22 | 100 | D4 | 4 | D1 |
| F3 | F31 | 525 | D3 | 6 | D1 |
|    | F32 | 175 | D4 | 6 | D1 |
| F4 | F41 | 225 | D3 | 8 | D1 |
|    | F42 | 75  | D4 | 8 | D1 |

TABLE 4

Sub-resources divided according to the resource cost time step function (candidate allocation time period D2)

| Original resource | Converted resource | cost | Time period of request moment | benefit | Time period of allocation moment |
|---|---|---|---|---|---|
| F1 | F13 | 300 | D3 | 4 | D2 |
|    | F14 | 100 | D4 | 4 | D2 |
|    | F15 | 200 | D5 | 4 | D2 |
| F2 | F23 | 300 | D3 | 2 | D2 |
|    | F24 | 100 | D4 | 2 | D2 |
|    | F25 | 200 | D5 | 2 | D2 |
| F3 | F33 | 525 | D3 | 8 | D2 |
|    | F34 | 175 | D4 | 8 | D2 |
|    | F35 | 350 | D5 | 8 | D2 |
| F4 | F43 | 225 | D3 | 4 | D2 |
|    | F44 | 75  | D4 | 4 | D2 |
|    | F45 | 150 | D5 | 4 | D2 |

As shown in Table 3, the situation where the cost is determined in the time period D5 but the benefit is determined in the time period D1 does not exist, because the time period D5 coincides with the time period D2, that is, the time period D5 is certainly posterior to the time period D1. In practical situations, only the situation where the resource request moment precedes the resource allocation moment exists, and the situation where the resource is allocated before being requested does not exist. This is because, there always needs to be a period of time from requesting a resource to allocating the resource. Of course, the step of removing the sub-resources whose request moments are posterior to the allocation moments is optional.

It can be seen from Table 3 and Table 4 that, there exists only a set of sub-resources for a candidate allocation time period, the set of sub-resources comprising sub-resources representative of all possible values of the resource costs. For example, for the candidate allocation time period D1, the corresponding set of sub-resources is F11, F12, F21, F22, F31, F32, F41, F42.

Second, the relations between the sub-resources are determined according to the relations between the resources. As described above, the resource F1 relies on the resource F2, and the resource F4 relies on the resource F3. Therefore, each sub-resource of the resource F1, respectively, relies on individual sub-resources of the resource F2, and each sub-resource of the resource F4, respectively, relies on individual sub-resources of the resource F3, as shown in Table 5 and Table 6. Since there are no exclusive relations between the resources F1, F2, F3 and F4, the relations between the sub-resources determined at this step do not include exclusive relations.

TABLE 5

Reliance relations between the corresponding sub-resources determined according to the reliance relations between the resource F1 and the resource F2

| Reliance relations between original resources | Reliance relations between sub-resources |
|---|---|
| F1 relying on F2 | (F11 relying on F21) or (F11 relying on F22) or (F11 relying on F23) or (F11 relying on F24) or (F11 relying on F25) or (F12 relying on F21) or (F12 relying on F22) or (F12 relying on F23) or (F12 relying on F24) or (F12 relying on F25) or (F13 relying on F21) or (F13 relying on F22) or (F13 relying on F23) or (F13 relying on F24) or (F13 relying on F25) or (F14 relying on F21) or (F14 relying on F22) or (F14 relying on F23) or (F14 relying on F24) or (F14 relying on F25) or (F15 relying on F21) or (F15 relying on F22) or (F15 relying on F23) or (F15 relying on F24) or (F15 relying on F25) |

TABLE 6

Reliance relations between the corresponding sub-resources determined according to the reliance relations between the resource F3 and the resource F4

| Reliance relations between original resources | Reliance relations between sub-resources |
|---|---|
| F4 relying on F3 | (F41 relying on F31) or (F41 relying on F32) or (F41 relying on F33) or (F41 relying on F34) or (F41 relying on F35) or (F42 relying on F31) or (F42 relying on F32) or (F42 relying on F33) or (F42 relying on F34) or (F42 relying on F35) or (F43 relying on F31) or (F43 relying on F32) or (F43 relying on F33) or (F43 relying on F34) or (F43 relying on F35) or (F44 relying on F31) or (F44 relying on F32) or (F44 relying on F33) or (F44 relying on F34) or (F44 relying on F35) or (F45 relying on F31) or (F45 relying on F32) or (F45 relying on F33) or (F45 relying on F34) or (F45 relying on F35) |

Finally, relations between sub-resources corresponding to the same resource are set as exclusive relations.

Apparently, the actual request moment and allocation moment can only fall into a determined time period. By taking the resource F1, as an example, among the sub-resources F11, F12, F13, F14 and F15 thereof, only one of them can occur in fact, so exclusive relations exist between the sub-resources. Similarly, exclusive relations also exist between the sub-resources corresponding to a same other resource, as shown in Table 7.

TABLE 7

Exclusive relations between the sub-resources

Exclusive (F11, F12, F13, F14, F15)
Exclusive (F21, F22, F23, F24, F25)
Exclusive (F31, F32, F33, F34, F35)
Exclusive (F41, F42, F43, F44, F45)

In this way, the resources and reliance relations between the resources are converted into: sub-resources, reliance relations between the sub-resources, and exclusive relations between the sub-resources, according to the resource benefit time step function and the resource cost time step function. As compared with the serialization method described before, the method of dividing the resources into sub-resources further discovers the exclusive relations between the sub-resources.

With respect to each candidate allocation time period, when the resource schedule optimizer is invoked, inputs to the resource schedule optimizer are: all sub-resources corresponding to the candidate allocation time period, resource costs of the sub-resources, resource benefits of the sub-resources and relations between the sub-resources. The relations comprise reliance relations and exclusive relations. For example, for the candidate allocation time period D1, the sub-resources inputs comprise: F11, F12, F21, F22, F31, F32, F41, F42; the reliance relations between the inputted sub-resources comprise: F11 relying on F21, F11 relying on F22, F12 relying on F21, F12 relying on F22, F41 relying on F31, F41 relying on F32, F42 relying on F31, and F42 relying on F32; the exclusive relations between the inputted sub-resources comprise: F11 excluding F12, F21 excluding F22, F31 excluding F32 and F41 excluding F42.

By making a condition that the desired resource benefit be as large as possible, and the desired resource cost condition that the resource cost is lower than 400, as an example, for D1, among the candidate allocation time periods, the resource schedule optimizer will select F22, F32 and F42 as a combination of sub-resources in conformity with the desired resource benefit; and for D2 among the candidate allocation time periods, the resource schedule optimizer will select F24, F34 and F44 as a combination of sub-resources in conformity with the desired resource benefit. Since the combination of sub-resources F22, F32 and F42 can produce more resource benefits than the combination of sub-resources F24, F34 and F44, the combination of the sub-resources F22, F32 and F42 is the optimum combination of sub-resources.

As shown in Table 3, F22, F32 and F42, respectively, correspond to the following: F2 request moment falls into the time period D4, F2 allocation moment falls into the time period D1; F3 request moment falls into the time period D4, F3 allocation moment falls into the time period D1; F4 request moment falls into the time period D4, F4 allocation moment falls into the time period D1. As long as the above results are satisfied, optimum resource allocation can be obtained.

As compared with the serialization method, the method according to the embodiment has a computation complexity changed from $O(M)^N$ to $O(N)$, where M is a number of the resources, and N is a number of time periods during which resource benefits and resource costs of the resources maintain unchanged. When optimization is made by using the method according to the embodiment of the invention, optimization for p times is needed in worst case, i.e., the resource schedule optimizer is invoked for p times, which is greatly reduced over the serialization method, where p is the number of times that the total resource benefits of the M resources change. When optimization is made by using the method according to this embodiment of the invention, the number of resources inputted to the resource schedule optimizer each time is N*q, and the number of reliance relations is $R*q^2+M*q*(q-1)/2$, which are greatly improved over the serialization method, where q is the number of times that the total resource benefits of the M resources change. This is particularly beneficial when the resource schedule optimizer is implemented by hardware, because more inputs mean more parallel processing. Furthermore, since the method according to this embodiment of the invention further identifies the exclusive relations between the sub-resources, this facilitates the resource schedule optimizer to reduce the search space, whereby the speed of obtaining the optimized results is accelerated.

Figure 3:
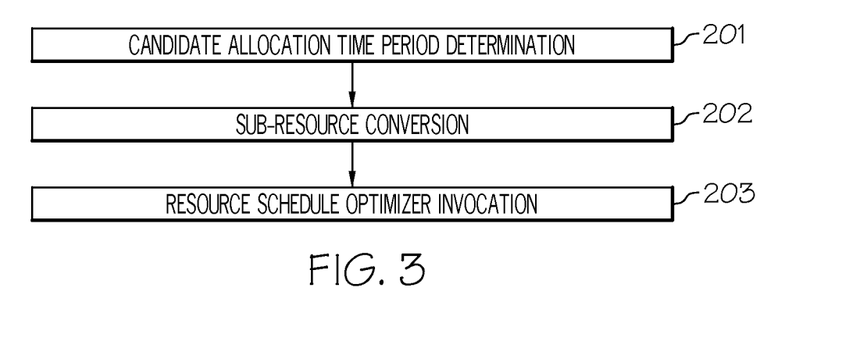
FIG. 3 is a block diagram showing a resource allocation system according to an embodiment of the invention.

FIG. 3 is a block diagram showing a resource allocation system according to an embodiment of the invention. A candidate time period is determined at block 201 and is configured to determine at least one candidate allocation time period according to a resource benefit time step function, wherein the resource benefit does not vary with time in the at least one candidate allocation time period.

Sub-resource conversion at block 202 is configured to convert resources and relations between the resources into sub-resource groups according to the resource cost time step function, wherein the sub-resource groups comprise sub-resources corresponding to the resources and relations between the sub-resources, and wherein the resource benefits and resource costs of the sub-resources do not vary with time. The resource schedule optimizer is invoked at block 203 and is configured to, with respect to the at least one candidate allocation time period, respectively, input the sub-resource groups into a resource schedule optimizer to thereby obtain optimized results with respect to the sub-resource groups, thereby obtaining an optimized result with respect to the at least one candidate allocation time period from the optimized results with respect to the sub-resource groups.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A resource allocation method, comprising:
determining, using a processor, at least one candidate allocation time period according to a resource benefit time step function, wherein a benefit of a resource does not vary with time in said at least one candidate allocation time period;
converting, with said processor and a resource cost time step function, said resources into sub-resources;
converting said sub-resources into sub-resource groups by correspondingly applying any pre-determined relations between said resources to said sub-resources wherein said sub-resource groups comprise sub-resources representative of all possible values of resource costs and any exclusive relations between said resources, and wherein the resource costs of the sub-resources depend on request moments corresponding to the sub-resources and the resource cost time step function, and wherein converting said sub-resources into sub-resource groups further comprises removing sub-resources whose request moments are posterior to any candidate allocation moments; and
with respect to said at least one candidate allocation time period, inputting said sub-resource groups into a resource schedule optimizer to obtain optimized results with respect to said sub-resource groups and said at least one candidate allocation time period.

2. The method according to claim 1, wherein converting said sub-resources into sub-resource groups comprises:
using a plurality of sub-resource groups to represent various combinations of the resource costs, wherein each of the plurality of sub-resource groups comprises sub-resources representative of a combination of the resource costs.

3. A resource allocation system comprising:
a processor; and
memory connected to the processor, wherein the memory is encoded with instructions and wherein the instructions when executed comprise:
instructions for determining at least one candidate allocation time period according to a resource benefit time step function, wherein a benefit of a resource does not vary with time in said at least one candidate allocation time period;
instructions for converting, with said processor and a resource cost time step function, said resources into sub-resources;
instructions for converting said sub-resources into sub-resource groups by correspondingly applying any pre-determined relations between said resources to said sub-resources wherein said sub-resource groups comprise sub-resources representative of all possible values of resource costs and any exclusive relations between said resources, and wherein the resource costs of the sub-resources depend on request moments corresponding to the sub-resources and the resource cost time step function, and wherein converting said sub-resources into sub-resource groups further comprises removing sub-resources whose request moments are posterior to any candidate allocation moments; and
instructions for, with respect to said at least one candidate allocation time period, inputting said sub-resource groups into a resource schedule optimizer to obtain optimized results with respect to said sub-resource groups and said at least one candidate allocation time period.

4. The system according to claim 3, wherein instructions for converting said sub-resources into sub-resource groups comprises:
instructions for using a plurality of sub-resource groups to represent various combinations of the resource costs, wherein one of the plurality sub-resource groups comprises sub-resources representative of a combination of the resource costs.

5. A computer program product for resource allocation, the computer program product comprising a computer readable storage device having computer readable program code embodied therewith, the computer readable program code comprising:

computer readable program code configured to determine at least one candidate allocation time period according to a resource benefit time step function, wherein a benefit of a resource does not vary with time in said at least one candidate allocation time period;

computer readable program code configured to convert, using a resource cost time step function, said resources into sub-resources;

computer readable program code configured to convert said sub-resources into sub-resource groups by correspondingly applying any pre-determined relations between said resources to said sub-resources wherein said sub-resource groups comprise sub-resources representative of all possible values of resource costs and any exclusive relations between said resources, and wherein the resource costs of the sub-resources depend on request moments corresponding to the sub-resources and the resource cost time step function, and wherein converting said sub-resources into sub-resource groups further comprises removing sub-resources whose request moments are posterior to any candidate allocation moments; and computer readable program code configured to, with respect to the at least one candidate allocation time period, input said sub-resource groups into a resource schedule optimizer to obtain optimized results with respect to said sub-resource groups and said at least one candidate allocation time period.

6. The computer program product of claim 5, wherein the computer readable program code configured to convert said sub-resources into sub-resource groups comprises:

computer readable program code configured to use a plurality of sub-resource groups to represent various combinations of the resource costs, wherein each of the plurality of sub-resource groups comprises sub-resources representative of a combination of the resource costs.

* * * * *